US008686086B2

(12) United States Patent
Abad et al.

(10) Patent No.: US 8,686,086 B2
(45) Date of Patent: Apr. 1, 2014

(54) METHOD FOR OBTAINING A RUBBER COMPOSITION INCLUDING A THERMOPLASTIC FILLER

(75) Inventors: Vincent Abad, Clermont-Ferrand Cedex (FR); Emmanuel Custodero, Clermont-Ferrand Cedex (FR); Damien Thomasson, Clermont-Ferrand Cedex (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 71 days.

(21) Appl. No.: 13/700,226

(22) PCT Filed: May 24, 2011

(86) PCT No.: PCT/EP2011/058486
§ 371 (c)(1),
(2), (4) Date: Dec. 17, 2012

(87) PCT Pub. No.: WO2011/151228
PCT Pub. Date: Dec. 8, 2011

(65) Prior Publication Data
US 2013/0096230 A1    Apr. 18, 2013

(30) Foreign Application Priority Data
Jun. 2, 2010 (FR) .................................... 10 54295

(51) Int. Cl.
*B60C 1/00* (2006.01)
*C08K 3/36* (2006.01)
*C08K 3/04* (2006.01)
*C08L 9/00* (2006.01)
*C08L 25/00* (2006.01)
*C08J 3/22* (2006.01)
*C08K 3/06* (2006.01)

(52) U.S. Cl.
USPC ........... 524/493; 524/495; 524/526; 524/571; 524/575; 523/351

(58) Field of Classification Search
USPC ........... 524/493, 495, 575, 526, 571; 523/351
See application file for complete search history.

(56) References Cited

U.S. PATENT DOCUMENTS

| | | | | |
|---|---|---|---|---|
| 5,977,238 A | 11/1999 | Labauze | ....................... | 524/492 |
| 6,013,718 A | 1/2000 | Cabioch et al. | ............... | 524/506 |
| 6,036,800 A | 3/2000 | Corvasce et al. | ............. | 156/123 |
| 6,503,973 B2 | 1/2003 | Robert et al. | ................. | 524/492 |
| 6,610,261 B1 | 8/2003 | Custodero et al. | ............. | 423/127 |
| 6,774,255 B1 | 8/2004 | Tardivat et al. | ............... | 556/427 |
| 6,815,473 B2 | 11/2004 | Robert et al. | ................. | 523/215 |
| 7,199,175 B2 | 4/2007 | Vasseur | .......................... | 524/492 |
| 7,217,751 B2 | 5/2007 | Durel et al. | ................... | 524/262 |
| 7,300,970 B2 | 11/2007 | Durel et al. | ................... | 524/493 |
| 7,312,264 B2 | 12/2007 | Gandon-Pain | ................. | 524/236 |
| 7,488,768 B2 | 2/2009 | Tardivat et al. | ............... | 524/262 |
| 7,491,767 B2 | 2/2009 | Durel et al. | .................... | 524/493 |
| 7,820,771 B2 | 10/2010 | Lapra et al. | .................... | 525/479 |
| 8,344,063 B2 | 1/2013 | Marechal et al. | ............. | 524/571 |
| 2002/0019484 A1 | 2/2002 | Nahmias et al. | ............... | 525/132 |
| 2007/0208135 A1* | 9/2007 | Gervat et al. | .................... | 525/88 |
| 2009/0160078 A1 | 6/2009 | Abad et al. | ................ | 264/178 R |
| 2009/0186961 A1 | 7/2009 | Araujo Da Silva et al. | .. | 523/150 |
| 2009/0209709 A1 | 8/2009 | Araujo Da Silva et al. | .......................... | 525/333.1 |
| 2009/0234066 A1 | 9/2009 | Araujo Da Silva et al. | .. | 524/571 |
| 2009/0270558 A1 | 10/2009 | Gandon-Pain et al. | ....... | 525/190 |
| 2010/0249270 A1 | 9/2010 | Robert et al. | .................. | 523/150 |
| 2010/0252156 A1 | 10/2010 | Robert et al. | .............. | 152/209.1 |
| 2012/0149822 A1 | 6/2012 | Abad et al. | ..................... | 524/449 |
| 2012/0156400 A1 | 6/2012 | Abad et al. | ....................... | 428/12 |
| 2012/0180923 A1 | 7/2012 | Custodero et al. | ............. | 152/502 |
| 2012/0285597 A1 | 11/2012 | Abad et al. | ..................... | 152/450 |
| 2012/0315408 A1 | 12/2012 | Chouvel et al. | .................. | 428/12 |

FOREIGN PATENT DOCUMENTS

| | | | |
|---|---|---|---|
| EP | 0 117 834 | A1 | 9/1984 |
| EP | 1 127 909 | A1 | 8/2001 |
| FR | 2 740 778 | A1 | 5/1997 |
| FR | 2 765 882 | A1 | 1/1999 |
| WO | WO 94/24208 | A1 | 10/1994 |
| WO | WO 97/36724 | A2 | 10/1997 |
| WO | WO 99/16600 | A1 | 4/1999 |
| WO | WO 01/92402 | A1 | 12/2001 |
| WO | WO 02/10269 | A2 | 2/2002 |
| WO | WO 02/30939 | A1 | 4/2002 |
| WO | WO 02/31041 | A1 | 4/2002 |
| WO | WO 02/083782 | A1 | 10/2002 |
| WO | WO 03/002648 | A1 | 1/2003 |
| WO | WO 03/002649 | A1 | 1/2003 |
| WO | WO 03/016837 | A1 | 2/2003 |
| WO | WO 2004/039872 | A1 | 5/2004 |
| WO | WO 2004/096865 | A2 | 11/2004 |
| WO | WO 2006/069792 | A1 | 7/2006 |
| WO | WO 2006/069793 | A1 | 7/2006 |
| WO | WO 2006/125532 | A1 | 11/2006 |
| WO | WO 2006/125533 | A1 | 11/2006 |
| WO | WO 2006/125534 | A1 | 11/2006 |
| WO | WO 2008/141702 | A1 | 11/2008 |
| WO | WO 2009/000750 | A1 | 12/2008 |
| WO | WO 2009/000752 | A1 | 12/2008 |
| WO | WO 2011151228 | A1 * | 12/2011 |

* cited by examiner

*Primary Examiner* — Ling-Siu Choi
*Assistant Examiner* — Ronald Grinsted
(74) *Attorney, Agent, or Firm* — Fitzpatrick, Cella, Harper & Scinto

(57) ABSTRACT

A process for the preparation of a rubber composition for the manufacture of tires is presented. The composition is based on one or more diene elastomers, one or more reinforcing fillers, and a crosslinking system. The composition includes particles of one or more thermoplastic materials chosen from amorphous thermoplastic materials and semicrystalline thermoplastic materials, with the glass transition temperature of the amorphous thermoplastic material or materials and the melting point of the semicrystalline thermoplastic material or materials varying from 80° C. to 300° C. The particles exhibit a volume-average diameter of less than or equal to 200 µm.

13 Claims, 1 Drawing Sheet

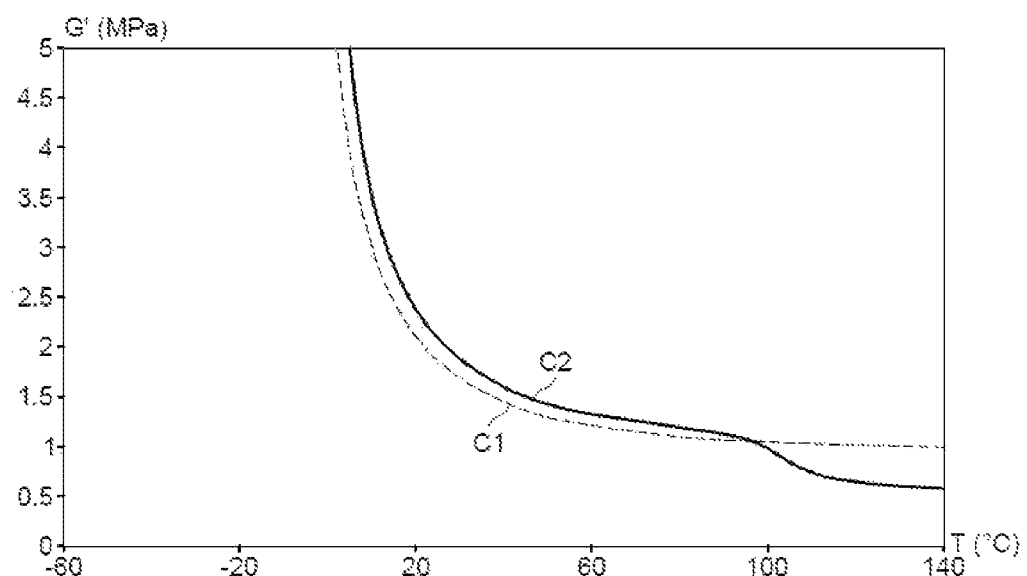

METHOD FOR OBTAINING A RUBBER COMPOSITION INCLUDING A THERMOPLASTIC FILLER

FIELD OF THE INVENTION

The present invention relates to a process for the preparation of a rubber composition which can be used in particular in the manufacture of tyres or tyre semifinished products, such as treads, the said composition being based on a diene elastomer, on a reinforcing filler, on particles of a specific thermoplastic material and on a crosslinking system.

BACKGROUND

In the field of the manufacture of tyres and in particular of the formulation of rubber compositions in contact with the ground, known as treads, the aim is generally to find the best possible compromise between conflicting performances, such as the behaviour of the vehicle, the rolling resistance, the dry and wet grip, and the wear.

In particular, it would be desirable to reduce the dynamic modulus of the materials forming the treads in order to promote grip and the indentation of the tread in the ground but, at the same time, treads of very high stiffness would be preferred in order to improve the performances in terms of wear and road behaviour.

Any modification to the formulation of the treads has consequences for the compromise between these performances.

In particular, it is known that the above compromise can be improved by producing rubber compositions which result in treads having a modulus of elasticity which greatly decreases at the surface as a result of a rise in temperature. This is because such a decrease in the modulus, for example during a braking action which is always accompanied by a local increase in the temperature, makes it possible to increase the degree of effective contact of the tread with the ground, in particular rough ground, and thereby to enhance the performances related to the contact, in particular ground grip, and thus the braking capability.

This result can be obtained by introducing, into a rubber composition for the manufacture of tyres based on one or more diene elastomers, on one or more reinforcing fillers and on a crosslinking system, particles of thermoplastic materials.

There is known, from the document WO 2004/039872, a process for the preparation of a composition based on diene elastomer and on thermoplastic polymer chosen from amorphous polymers with a glass transition temperature of greater than 80° C. and crystalline polymers with a melting point of greater than 190° C. The process comprises a stage of premixing the thermoplastic polymer with a portion of the diene elastomer, in order to obtain a masterbatch, this premixing being carried out at a temperature equal to or greater than the glass transition temperature or equal to or greater than the melting point reduced by 20° C., and then a stage of mixing the masterbatch with the remaining portion of the diene elastomer.

BRIEF DESCRIPTION OF THE INVENTION

There exists a need to provide a process which makes it possible to obtain such rubber compositions for the manufacture of tyres, comprising particles of thermoplastic materials, in which the particles are suitably dispersed, without these particles melting or coalescing. It is desired, in particular, to have available a process which makes it possible to control the size of these particles.

A subject-matter of the invention is thus a process for preparing a rubber composition, based on one or more diene elastomers, on one or more reinforcing fillers and on a crosslinking system, comprising particles of one or more thermoplastic materials chosen from amorphous thermoplastic materials and semicrystalline thermoplastic materials, the glass transition temperature of the said amorphous thermoplastic material or materials and the melting point of the semicrystalline thermoplastic material or materials varying from 80° C. to 300° C., the said particles exhibiting a volume-average diameter of less than or equal to 200 μm, comprising the following stages:

incorporating in the diene elastomer or elastomers, during a first "non-productive" stage, the reinforcing filler or fillers, everything being kneaded thermomechanically, in one or more goes, until a maximum temperature of between 130° C. and 200° C. is reached, cooling the combined mixture to a temperature of less than 60° C., subsequently incorporating, during a second "productive" stage, the crosslinking system, the particles of the said amorphous thermoplastic material or materials, the glass transition temperature of which is less than 200° C., and the particles of the said semicrystalline thermoplastic material or materials, the melting point of which is less than 200° C., then kneading everything up to a maximum temperature of less than 80° C., it being understood that the particles of the said amorphous thermoplastic material or materials, the glass transition temperature of which is greater than or equal to 200° C., and the particles of the said semicrystalline thermoplastic material or materials, the melting point of which is greater than or equal to 200° C., are introduced during the first "non-productive" stage or during the second "productive" stage or during both stages.

BRIEF DESCRIPTION OF THE DRAWINGS

The invention and its advantages will be easily understood in the light of the description and the implementational example which follows, as well as of FIG. 1 relating to this example, which represents curves of variation in elastic modulus as a function of the temperature for rubber compositions.

DETAILED DESCRIPTION OF EMBODIMENTS OF THE INVENTION

I. Measurements and Tests Used

The dynamic characterizations of the elastomer materials are carried out on a viscosity analyser (VA4000 from Métravib) according to Standard ASTM D5992-96. The response of a sample of vulcanized composition (cylindrical test specimen with a thickness of 4 mm and with a cross section of 400 mm$^2$), subjected to a simple alternating sinusoidal shear stress, at a frequency of 10 Hz, is recorded during a temperature sweep from 0° C. to 150° C. with a gradient of 5°/min, under a maximum stress of 0.7 MPa. The results made use of are the dynamic shear modulus G* and the loss factor tan δ in the given temperature range. The following equations exist:

$$G^* = \sqrt{G'^2 + G''^2} \text{ and } \tan \delta = G''/G'$$

G*: dynamic shear modulus in MPa;
G': true shear modulus in MPa;
G'': loss modulus in MPa; and
δ: phase shift between the imposed strain and the measured stress.

II. Conditions for the Implementation of the Invention

As explained above, the composition obtained by the process according to the invention is based on one or more diene elastomers, on one or more reinforcing fillers, on a crosslinking system and on specific particles of one or more thermoplastic materials.

The expression composition "based on" should be understood as meaning a composition comprising the mixture and/or the reaction product of the various constituents used, some of these base constituents being capable of reacting or intended to react with one another, at least in part, during the various phases of manufacture of the composition, in particular during the crosslinking thereof.

In the present description, unless expressly indicated otherwise, all the percentages (%) are % by weight. Moreover, any interval of values denoted by the expression "between a and b" represents the range of values extending from greater than a to less than b (i.e., limits a and b excluded), whereas any interval of values denoted by the expression "from a to b" means the range of values extending from a up to b (i.e., including the strict limits a and b).

II-1. Diene Elastomer

"Diene" elastomer or rubber should be understood as meaning, in a known way, an elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content of units of diene origin, always less than 15%). In the category of "essentially unsaturated" diene elastomers, "highly unsaturated" diene elastomer is understood to mean in particular a diene elastomer having a content of units of diene origin (conjugated dienes) which is greater than 50%.

Given these definitions, diene elastomer capable of being used in the compositions obtained according to the invention is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinyl-aromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the above-mentioned type, such as, in particular, 1,4-hexadiene, ethylidene-norbornene or dicyclopentadiene;

(d)—a copolymer of isobutene and of isoprene (butyl rubber) and also the halogenated versions, in particular chlorinated or brominated versions, of this type of copolymer.

Although it applies to any type of diene elastomer, a person skilled in the art of tyres will understand that the present invention is preferably employed with essentially unsaturated diene elastomers, in particular of the type (a) or (b) above.

The following are suitable in particular as conjugated dienes: 1,3-butadiene, 2-methyl-1,3-butadiene, 2,3-di($C_1$-$C_5$ alkyl)-1,3-buta-dienes, such as, for example, 2,3-dimethyl-1,3-butadiene, 2,3-diethyl-1,3-butadiene, 2-methyl-3-ethyl-1,3-butadiene or 2-methyl-3-iso-propyl-1,3-butadiene, an aryl-1,3-butadiene, 1,3-pentadiene or 2,4-hexadiene. The following, for example, are suitable as vinyl-aromatic compounds: styrene, ortho-, meta- or para-methylstyrene, the "vinyl toluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion, in emulsion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as aminobenzophenone, for example; for coupling with a reinforcing inorganic filler, such as silica, mention may be made, for example, of silanol or polysiloxane functional groups having a silanol end (such as described, for example, in FR 2 740 778, U.S. Pat. No. 6,013,718 or WO 2008/141702), of alkoxysilane groups (such as described, for example, in FR 2 765 882 or U.S. Pat. No. 5,977,238), of carboxyl groups (such as described, for example, in WO 01/92402, U.S. Pat. No. 6,815,473, WO 2004/096865 or US 2006/0089445) or of polyether groups (such as described, for example, in EP 1 127 909, U.S. Pat. No. 6,503,973, WO 2009/000750 or WO 2009/000752). Mention may also be made, as other examples of functionalized elastomers, of the elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a glass transition temperature Tg (measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between 5° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To sum up, the diene elastomer or elastomers of the composition obtained according to the invention are preferably chosen from the group of the highly unsaturated diene elastomers consisting of polybutadienes (abbreviated to "BRs"), synthetic polyisoprenes (IRs), natural rubber (NR), butadiene copolymers, isoprene copolymers and the mixtures of these elastomers. Such copolymers are more preferably chosen from the group consisting of butadiene/styrene copolymers (SBRs), isoprene/butadiene copolymers (BIRs), isoprene/styrene copolymers (SIRs) and isoprene/butadiene/styrene copolymers (SBIRs), preferably butadiene/styrene copolymers.

According to a specific embodiment, the diene elastomer is predominantly (i.e., for more than 50 phr) an SBR, whether an SBR prepared in emulsion ("ESBR") or an SBR prepared in solution ("SSBR"), or an SBR/BR, SBR/NR (or SBR/IR), BR/NR (or BR/IR) or also SBR/BR/NR (or SBR/BR/IR) blend (mixture). In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

According to another specific embodiment, the diene elastomer is predominantly (for more than 50 phr) an isoprene elastomer. This is the case in particular when the compositions obtained according to the invention are intended to constitute, in the tyres, rubber matrices of certain treads (for example for industrial vehicles), of crown reinforcing plies (for example of working plies, protection plies or hooping plies), of carcass reinforcing plies, of sidewalls, of beads, of protectors, of underlayers, of rubber blocks and other internal rubbers providing the interface between the abovementioned regions of the tyres.

"Isoprene elastomer" is understood to mean, in a known way, an isoprene homopolymer or copolymer, in other words a diene elastomer chosen from the group consisting of natural rubber (NR), synthetic polyisoprenes (IRs), the various copolymers of isoprene and the mixtures of these elastomers. Mention will in particular be made, among isoprene copolymers, of isobutene/isoprene copolymers (butyl rubber—IIRs), isoprene/styrene copolymers (SIRs), isoprene/butadiene copolymers (BIRs) or isoprene/butadiene/styrene copolymers (SBIRs). This isoprene elastomer is preferably natural rubber or a synthetic cis-1,4-polyisoprene; use is preferably made, among these synthetic polyisoprenes, of the polyisoprenes having a content (mol %) of cis-1,4-bonds of greater than 90%, more preferably still of greater than 98%.

According to another specific embodiment, in particular when it is intended for a tyre sidewall or for an airtight internal rubber of a tubeless tyre (or other air-impermeable component), the composition obtained according to the invention can comprise at least one essentially saturated diene elastomer, in particular at least one EPDM copolymer or one butyl rubber (optionally chlorinated or brominated), whether these copolymers are used alone or as a mixture with highly unsaturated diene elastomers as mentioned above, in particular NR or IRs, BRs or SBRs.

According to another preferred embodiment of the invention, the rubber composition comprises a blend of a (one or more) "high Tg" diene elastomer exhibiting a Tg of between −70° C. and 0° C. and of a (one or more) "low Tg" diene elastomer of between −110° C. and −80° C., more preferably between −105° C. and −90° C. The high Tg elastomer is preferably chosen from the group consisting of S-SBRs, E-SBRs, natural rubber, synthetic polyisoprenes (exhibiting a content (mol %) of cis-1,4-structures preferably of greater than 95%), BIRs, SIRs, SBIRs and the mixtures of these elastomers. The low Tg elastomer preferably comprises butadiene units according to a content (mol %) at least equal to 70%; it preferably consists of a polybutadiene (BR) exhibiting a content (mol %) of cis-1,4-structures of greater than 90%.

According to another specific embodiment of the invention, the rubber composition comprises, for example, from 30 to 100 phr, in particular from 50 to 100 phr, of a high Tg elastomer as a blend with from 0 to 70 phr, in particular from 0 to 50 phr, of a low Tg elastomer; according to another example, it comprises, for the whole of the 100 phr, one or more SBR(s) prepared in solution.

According to another specific embodiment of the invention, the diene elastomer of the composition obtained according to the invention comprises a blend of a BR (as low Tg elastomer) exhibiting a content (mol %) of cis-1,4-structures of greater than 90% with one or more S-SBR(s) or E-SBR(s) (as high Tg elastomer(s)).

The composition obtained according to the invention can comprise just one diene elastomer or a mixture of several diene elastomers, it being possible for the diene elastomer or elastomers to be used in combination with any type of synthetic elastomer other than a diene elastomer, indeed even with polymers other than elastomers, for example thermoplastic polymers.

II-2. Particles of Thermoplastic Material

As explained above, the rubber composition obtained according to the invention comprises particles of one or more thermoplastic materials. The thermoplastic material or materials are chosen from amorphous thermoplastic materials and semicrystalline thermoplastic materials, the glass transition temperature of the said amorphous thermoplastic material or materials and the melting point of the semicrystalline thermoplastic material or materials varying from 80° C. to 300° C.

The thermoplastic materials are generally chosen from polypropylenes, polyethylenes, polystyrenes, acrylonitrile/butadiene/styrene copolymers, polymethyl methacrylates, polyamides, polyphenylene ethers, polycarbonates, polyacetals, thermoplastic polyurethanes, thermoplastic fluoropolymers and polyesters.

Preferably, the polyesters are chosen from polyethylene terephthalates, polybutylene terephthalates and polyethylene naphthoates.

The fluoropolymers can be chosen from copolymers of tetrafluoroethylene and hexafluoropropene, copolymers of tetrafluoroethylene and perfluorovinyl ether, copolymers of tetrafluoroethylene and ethylene, and polyvinylidene fluoride.

Preferably, the glass transition temperature of the said amorphous thermoplastic material or materials and the melting point of the semicrystalline thermoplastic material or materials vary from 80° C. to 200° C.

According to the invention, the particles exhibit a volume-average diameter of less than or equal to 200 μm, preferably of between 50 and 100 μm.

The volume-average size of the particles of thermoplastic material was determined with a Coulter counter.

A Coulter counter is a device intended to count particles and cells and to measure the size thereof. It is used, for example, for bacteria or for the analysis of the distribution in the size of particles in the measurement of air quality. The Coulter counter has been sold since the 1950s.

The counter detects the change in the electrical resistance when an electrolyte comprising particles or cells is passed through a small opening which can be calibrated. The cells, not themselves being conductive, for this reason generate a variation in the resistance. This variation depends on the size of each particle counted.

The particles of the said thermoplastic material or materials preferably represent from 10 to 50 phr, better still from 20 to 40 phr.

Preferably, the particles represent at most 20%, better still at most 10%, by volume, with respect to the total volume of the composition.

The presence in the rubber composition of these particles of thermoplastic materials, the glass transition temperature for the amorphous materials or the melting point for the semicrystalline materials of which is between 80° C. to 300° C., makes possible the softening of the composition during the rise in temperature, in particular in the event of braking. This makes it possible to increase the contact surface area of the tread on the ground, in particular rough ground, and thus the grip.

II-3. Reinforcing Filler

Use may be made of any type of reinforcing filler known for its abilities to reinforce a rubber composition which can be used in the manufacture of tyres, for example an organic filler, such as carbon black, a reinforcing inorganic filler, such as silica, or also a blend of these two types of filler, in particular a blend of carbon black and silica.

All carbon blacks, in particular the blacks conventionally used in tyres ("tyre-grade" blacks), are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or also, depending on the applications targeted, of the blacks of higher series (for example N660, N683 or N772). The carbon blacks might, for example, be already incorporated in the isoprene elastomer in the form of a masterbatch (see, for example, Applications WO 97/36724 or WO 99/16600).

Mention may be made, as examples of organic fillers other than carbon blacks, of the functionalized polyvinylaromatic organic fillers as described in Applications WO-A-2006/069792 and WO-A-2006/069793.

"Reinforcing inorganic filler" should be understood, in the present patent application, by definition, as meaning any inorganic or mineral filler, whatever its colour and its origin (natural or synthetic), also known as "white filler", "clear filler" or even "non-black filler", in contrast to carbon black, capable of reinforcing by itself alone, without means other than an intermediate coupling agent, a rubber composition intended for the manufacture of tyres, in other words capable of replacing, in its reinforcing role, a conventional tyre-grade carbon black; such a filler is generally characterized, in a known way, by the presence of hydroxyl (—OH) groups at its surface.

The physical state under which the reinforcing inorganic filler is provided is not important, whether it is in the form of a powder, of microbeads, of granules, of beads or any other appropriate densified form. Of course, reinforcing inorganic filler is also understood to mean mixtures of different reinforcing inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or pyrogenic silica exhibiting a BET surface and a CTAB specific surface both of less than 450 $m^2/g$, preferably from 30 to 400 $m^2/g$. Mention will be made, as highly dispersible precipitated silicas ("HDSs"), for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber or the silicas with a high specific surface as described in Application WO 03/16837.

When the composition obtained according to the invention is intended for tyre treads having a low rolling resistance, the reinforcing inorganic filler used, in particular if it is silica, preferably has a BET surface of between 45 and 400 $m^2/g$, more preferably of between 60 and 300 $m^2/g$.

Preferably, the content of total reinforcing filler (carbon black and/or reinforcing inorganic filler, such as silica) is between 20 and 200 phr, more preferably between 30 and 150 phr, the optimum being, in a known way, different depending on the specific applications targeted: the level of reinforcement expected with regard to a bicycle tyre, for example, is, of course, less than that required with regard to a tyre capable of running at high speed in a sustained manner, for example a motorcycle tyre, a tyre for a passenger vehicle or a tyre for a utility vehicle, such as a heavy duty vehicle.

According to a preferred embodiment of the invention, use is made of a reinforcing filler comprising between 30 and 150 phr, more preferably between 50 and 120 phr, of inorganic filler, particularly of silica, and optionally carbon black; the carbon black, when it is present, is preferably used at a content of less than 20 phr, more preferably of less than 10 phr (for example between 0.1 and 10 phr).

In order to couple the reinforcing inorganic filler to the diene elastomer, use is made, in a known way, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "unsymmetrical" depending on their specific structure, as described, for example, in Applications WO 03/002648 (or US 2005/016651) and WO 03/002649 (or US 2005/016650).

"Symmetrical" silane polysulphides corresponding to the following general formula (III):

$$Z-A-S_x-A-Z, \text{ in which:} \qquad (III)$$

x is an integer from 2 to 8 (preferably from 2 to 5);
A is a divalent hydrocarbon radical (preferably, $C_1$-$C_{18}$ alkylene groups or $C_6$-$C_{12}$ arylene groups, more particularly $C_1$-$C_{10}$, in particular $C_1$-$C_4$, alkylenes, especially propylene);
Z corresponds to one of the formulae below:

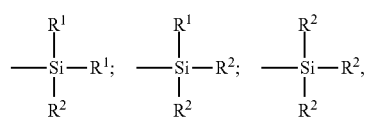

in which:
the $R^1$ radicals, which are unsubstituted or substituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl), the $R^2$ radicals, which are unsubstituted or substituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl), are suitable in particular, without the above definition being limiting.

In the case of a mixture of alkoxysilane polysulphides corresponding to the above formula (III), in particular the usual mixtures available commercially, the mean value of the "x" index is a fractional number preferably of between 2 and 5, more preferably in the vicinity of 4. However, the invention can also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl ($C_1$-$C_4$)alkyl) polysulphides (in particular disulphides, trisulphides or tetrasulphides), such as, for example, bis(3-trimethoxysilylpropyl) or bis(3-triethoxysilylpropyl) polysulphides. Use is in particular made, among these compounds, of bis(3-triethoxysilylpropyl)tetrasulphide, abbreviated to TESPT, of formula $[(C_2H_5O)_3Si(CH_2)_3S_2]_2$, or bis(triethoxysilylpropyl)disulphide, abbreviated to TESPD, of formula $[(C_2H_5O)_3Si(CH_2)_3S]_2$. Mention will also be made, as preferred examples, of bis(mono($C_1$-$C_4$)alkoxyldi($C_1$-$C_4$)alkylsilylpropyl) polysulphides (in particular disulphides, trisulphides or tetrasulphides), more particularly bis(monoethoxydimethylsilylpropyl)tetrasulphide, as described in Patent Application WO 02/083782 (or US 2004/132880).

Mention will in particular be made, as coupling agent other than alkoxysilane polysulphide, of bifunctional POSs (polyorganosiloxanes) or of hydroxysilane polysulphides ($R^2$=OH in the above formula III), such as described in Patent Applications WO 02/30939 (or U.S. Pat. No. 6,774,255) and WO 02/31041 (or US 2004/051210), or of silanes or POSs carrying azodicarbonyl functional groups, such as described, for example, in Patent Applications WO 2006/125532, WO 2006/125533 and WO 2006/125534.

In the rubber compositions obtained according to the invention, the content of coupling agent is preferably between 4 and 12 phr, more preferably between 3 and 8 phr.

A person skilled in the art will understand that use might be made, as filler equivalent to reinforcing inorganic filler described in the present section, of a reinforcing filler of another nature, in particular organic nature, provided that this reinforcing filler is covered with an inorganic layer, such as silica, or else comprises, at its surface, functional sites, in particular hydroxyl sites, requiring the use of a coupling agent for establishing the bond between the filler and the elastomer.

II.4 Crosslinking System

The crosslinking system proper is based on sulphur (or on a sulphur-donating agent) and on a primary crosslinking accelerator. Various known secondary accelerators or crosslinking activators, such as zinc oxide, stearic acid or equivalent compounds, or guanidine derivatives (in particular diphenylguanidine), come to be added to this base crosslinking system, being incorporated during the first non-productive phase and/or during the productive phase, as described subsequently.

The sulphur is used at a preferred content of between 0.5 and 10 phr, more preferably of between 0.5 and 5 phr and in particular between 0.5 and 3 phr, when the composition obtained according to the invention is intended, according to a preferred form of the invention, to form a tyre tread.

For its part, the primary crosslinking accelerator is used at a preferred content varying from 0.5 to 10 phr, more preferably from 0.5 to 5 phr.

The primary crosslinking accelerator must make possible the crosslinking of the rubber compositions in industrially acceptable times, while retaining a minimum safety time ("scorch time") during which the compositions can be shaped without risk of premature crosslinking ("scorching").

Use may be made of any compound capable of acting as accelerator for the crosslinking of diene elastomers in the presence of sulphur.

Accelerators of the thiazole type and their derivatives of formula (I):

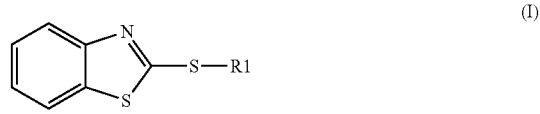

in which $R^1$ represents a hydrogen atom, a 2-mercaptobenzothiazyl group of formula (II):

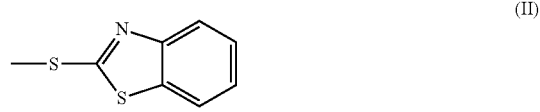

or a group of formula (III):

in which $R^2$ and $R^3$ independently represent a hydrogen atom, a 2-mercaptobenzothiazyl group (formula (II)), a $C_1$-$C_4$ alkyl group or a $C_5$-$C_8$ cycloalkyl group, preferably comprising 6 ring members, it being possible for said ring to comprise at least one heteroatom, such as S, O or N, are suitable in particular.

Thiazole accelerators and preferred derivatives are chosen in particular from the group consisting of 2-mercaptobenzothiazole, 2-mercaptobenzothiazyl disulphide (abbreviated to "MBTS"), N-cyclohexyl-2-benzothiazolesulphenamide (abbreviated to "CBS"), N,N-dicyclohexyl-2-benzothiazolesulphenamide (abbreviated to "DCBS"), N-tert-butyl-2-benzothiazolesulphenamide (abbreviated to "TBBS"), N-cyclohexyl-2-benzothiazolesulphenimide, N-tert-butyl-2-benzothiazolesulphenimide (abbreviated to "TBSI") and the mixtures of these compounds.

The crosslinking system of the composition according to the invention can also comprise one or more additional primary accelerators, in particular compounds of the family of the thiurams, zinc dithiocarbamate derivatives or thiophosphates.

II-5. Various Additives

The rubber composition obtained according to the invention can also comprise all or a portion of the usual additives generally used in the elastomer compositions intended for the manufacture of tyres, in particular of treads, such as, for example, plasticizers or extending oils, whether the latter are aromatic or nonaromatic in nature, pigments, protection agents, such as antiozone waxes (such as Cire Ozone C32 ST), chemical antiozones, antioxidants (such as 6-PPD), antifatigue agents, reinforcing resins, methylene acceptors (for example phenolic novolak resin) or methylene donors (for example HMT or H3M), as described, for example, in Application WO 02/10269.

Preferably, the composition obtained according to the invention comprises, as preferred nonaromatic or very slightly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and the mixtures of such compounds.

The composition obtained according to the invention can also comprise, in addition to the coupling agents, coupling activators, covering agents for the reinforcing inorganic filler or more generally processing aids capable, in a known way, by virtue of an improvement in the dispersion of the inorganic filler in the rubber matrix and of a lowering of the viscosity of the compositions, of improving their property of processing in the raw state, these agents being, for example, hydrolysable silanes, such as alkylalkoxysilanes (in particular alkyltriethoxysilanes), polyols, polyethers (for example polyethylene glycols), primary, secondary or tertiary amines (for example trialkanolamines), hydroxylated or hydrolysable POSs, for example $\alpha,\omega$-dihydroxypolyorganosiloxanes (in particular $\alpha,\omega$-dihydroxypolydimethylsiloxanes), or fatty acids, such as, for example, stearic acid.

II-6. Manufacture of the Rubber Compositions

The rubber composition obtained according to the invention is manufactured in appropriate mixers using two successive preparation phases according to a general procedure well known to a person skilled in the art: a first phase of thermomechanical working or kneading (sometimes described as "non-productive" phase) at high temperature, up to a maximum temperature of between 130° C. and 200° C., preferably between 145° C. and 185° C., followed by a second phase of mechanical working (sometimes described as "productive" phase) at a lower temperature, typically of less than 120° C., for example between 60° C. and 100° C., finishing phase during which the crosslinking or vulcanization system is incorporated.

According to a preferred embodiment of the invention, all the base constituents of the composition obtained according to the invention, with the exception of the crosslinking system, particles of the amorphous thermoplastic material or materials, the glass transition temperature of which is less than 200° C., and particles of the semicrystalline thermoplastic material or materials, the melting point of which is less than 200° C., namely the reinforcing filler or fillers, optionally the particles of the amorphous thermoplastic material or materials, the glass transition temperature of which is greater than or equal to 200° C., and optionally the particles of the semicrystalline thermoplastic material or materials, the melting point of which is greater than or equal to 200° C., and the coupling agent, if appropriate, are intimately incorporated, by kneading, in the diene elastomer or the diene elastomers during the first "non-productive" phase, that is to say that at least these various base constituents are introduced into the mixer and that kneading is carried out thermomechanically, in one or more stages, until the maximum temperature of between 130° C. and 200° C., preferably of between 145° C. and 185° C., is reached.

By way of example, the first (non-productive) phase is carried out in a single thermomechanical stage during which all the necessary constituents, the optional additional covering agents or processing aids and various other additives, and also the particles of the amorphous thermoplastic material or materials, the glass transition temperature of which is greater than 200° C., indeed even greater than 180° C., and the particles of the semicrystalline thermoplastic material or materials, the melting point of which is greater than 200° C., indeed even greater than 180° C., with the exception of the crosslinking system, are introduced into an appropriate mixer, such as a normal internal mixer. The total duration of the kneading, in this non-productive phase, is preferably between 1 and 15 min. After cooling the mixture thus obtained during the first non-productive phase, the crosslinking system, the particles of the amorphous thermoplastic material or materials, the glass transition temperature of which is less than 200° C., and the particles of the semicrystalline thermoplastic material or materials, the melting point of which is less than 200° C., are then incorporated, at low temperature, generally in an external mixer, such as an open mill; everything is then mixed (productive phase) for a few minutes, for example between 2 and 15 min.

The particles of the amorphous thermoplastic material or materials, the glass transition temperature of which is less than 200° C. (and especially less than 180° C.), and the particles of the semicrystalline thermoplastic material or materials, the melting point of which is less than 200° C. (and especially less than 180° C.), must not be introduced during the non-productive phase which takes place at high temperature, since it is desired to avoid the situation whereby the thermoplastic particles melt and/or coalesce after they have been introduced into the mixer.

The final composition thus obtained is subsequently calendered, for example in the form of a sheet or of a plaque, in particular for laboratory characterization, or else extruded in the form of a rubber profiled element which can be used, for example, as a tyre tread for a passenger vehicle.

The composition obtained according to the invention can be used in the manufacture of a finished article or of a semifinished product intended for a motor vehicle ground-contact system, such as a tyre, internal safety support for a tyre, wheel, rubber spring, elastomeric joint, other suspension or antivibratory element. In particular, the composition obtained according to the invention can be used in the manufacture of semifinished products made of rubber intended for tyres, such as treads, crown reinforcing plies, sidewalls, carcass reinforcing plies, beads, protectors, underlayers, rubber blocks and other internal rubbers, in particular decoupling rubbers, intended to provide the bonding or the interface between the abovementioned regions of the tyres.

The tyres comprising a composition obtained according to the invention are intended in particular for passenger vehicles as for industrial vehicles chosen from vans, "heavy-duty vehicles"—i.e., underground, bus, heavy road transport vehicles (lorries, tractors, trailers) or off-road vehicles—, heavy agricultural vehicles or earthmoving equipment, planes, and other transportation or handling vehicles III. Example of the Implementation of the Invention III-1. Preparation of the Compositions The procedure for the tests which follow is as follows: the diene elastomer or elastomers, the reinforcing filler or fillers and the optional coupling agent are introduced into an internal mixer, which is 70% filled and which has an initial vessel temperature of approximately 90° C., followed, after kneading for one to two minutes, by the various other ingredients, with the exception of the crosslinking system and the particles of the thermoplastic material. Thermomechanical working (non-productive phase) is then carried out in one stage (total duration of the kneading equal to approximately 5 min), until a maximum "dropping" temperature of approximately 165° C. is reached. The mixture thus obtained is recovered and cooled, and then the crosslinking system (sulphur and thiazole compound) and the optional particles of thermoplastic material are added on an external mixer (homofinisher) at 70° C., everything being mixed (productive phase) for approximately from 5 to 6 min.

The compositions thus obtained are subsequently calendered, either, on the one hand, in the form of plaques (thickness of 2 to 3 mm) or of thin sheets of rubber, for the measurement of their physical or mechanical properties, or, on the other hand, in the form of profiled elements which can be used directly, after cutting to and/or assembling at the desired dimensions, for example as semifinished products for tyres, in particular as tyre treads.

III-2. Characterization Tests—Results

The object of this example is to compare the dynamic properties of a rubber composition which can be used for the manufacture of a tyre tread comprising polystyrene particles (composition 2) with the properties of a rubber composition not comprising the said particles (composition 1).

The formulations of the rubber compositions are given in Table 1. The amounts are expressed as parts per 100 parts by weight of elastomer (phr).

The contents of oil and of plasticizing resin were adjusted in order to obtain substantially the same dynamic modulus G' at ambient temperature.

TABLE 1

|    |                          | Composition 1 | Composition 2 |
|----|--------------------------|---------------|---------------|
| IM | SBR 1 (1)                | 40            | 40            |
|    | SBR 2 (2)                | 60            | 60            |
|    | Carbon black (3)         | 4             | 4             |
|    | Silica (4)               | 92            | 92            |
|    | Antioxidant (5)          | 2             | 2             |
|    | Plasticizing oil (6)     | 21            | 29            |
|    | Antiozone wax (7)        | 1.5           | 1.5           |
|    | Plasticizing resin (8)   | 21            | 29            |
|    | Coupling agent (9)       | 7.4           | 7.4           |
|    | Stearic acid (10)        | 2             | 2             |
|    | DPG (11)                 | 1.5           | 1.5           |
|    | Zinc oxide (12)          | 2.8           | 2.8           |
| EM | Accelerator (13)         | 2.1           | 2.1           |
|    | CTP (14)                 | 0.15          | 0.15          |
|    | Sulphur                  | 1.4           | 1.4           |
|    | Polystyrene particles (15) | —           | 30            |

IM: internal mixer
EM: external mixer
(1) SSBR with 40% of styrene (% by weight of styrene/all of the polymer), 24% of 1,2-polybutadiene units and 48% of trans-1,4-polybutadiene units (% of 1,2- or 1,4- units/all of the polybutadiene);
(2) SSBR with 28% of styrene, 4% of 1,2-polybutadiene units and 81% of trans-1,4-polybutadiene units (% as 1,2- or 1,4- units/all of the polybutadiene);
(3) Carbon black N234 (ASTM grade, Degussa);
(4) Silica "Zeosil 1165MP" from Rhodia, in the form of microbeads (BET and CTAB: approximately 150-160 m²/g);
(5) N-(1,3-Dimethylbutyl)-N-phenyl-paraphenylenediamine ("Santoflex 6-PPD" from Flexsys);
(6) TDAE (Treated Distillate Aromatic Extracts) oil;
(7) Mixture of macro- and microcrystalline antiozone waxes;
(8) C5/C9-type hydrocarbon resin ("Escorez" from Exxon);
(9) TESPT ("Si69" from Degussa);
(10) Stearin ("Pristerene 4931", Uniqema);
(11) Diphenylguanidine ("Perkacit DPG" from Flexsys);
(12) Zinc oxide (industrial grade, Umicore);
(13) N-Cyclohexyl-2-benzothiazolesulphenamide ("Santocure CBS" from Flexsys);
(14) Cyclohexylthiophthalimide (PVI);
(15) "Primecast 101" (EOS GmbH); Tg = 105° C., volume-average diameter: 80 µm (supplier's data).

The change in the dynamic modulus G' of each composition is measured as a function of the temperature, under a stress of 0.7 MPa.

Results

The results are given in FIG. 1.

The curve C1 represents the variation in the elastic modulus of composition 1 (control composition) and the curve C2 represents the variation in the elastic modulus of composition 2 according to the invention.

A large decrease in the modulus is observed above 80° C. Thus, for example:

$(G'_{40°\,C.} - G'_{140°\,C.})/G'_{40°\,C.} = 31\%$ for composition 1 (control composition)

$(G'_{40°\,C.} - G'_{140°\,C.})/G'_{40°\,C.} = 64\%$ for composition 2 according to the invention.

Thus, the introduction of polystyrene particles into the rubber composition makes possible softening of the latter at high temperature.

The invention claimed is:

1. A process for preparing a rubber composition usable in manufacturing tyres, the composition being based on one or more diene elastomers, one or more reinforcing fillers, and a crosslinking system, the composition further including particles of one or more thermoplastic materials chosen from amorphous thermoplastic materials and semicrystalline thermoplastic materials, with a glass transition temperature of the one or more amorphous thermoplastic materials and a melting point of the one or more semicrystalline thermoplastic materials being in a range of from 80° C. to 300° C., and with the particles exhibiting a volume-average diameter of less than or equal to 200 µm, the process comprising:

incorporating in at least one diene elastomer, during a non-productive stage, at least one reinforcing filler to form a first mixture, and thermomechanically kneading the first mixture in one or more kneading events until a maximum temperature of between 130° C. and 200° C. is reached;

cooling the first mixture to a temperature of less than 60° C.;

subsequently incorporating in the first mixture, during a productive stage, a crosslinking system, particles of at least one amorphous thermoplastic material having a glass transition temperature of less than 200° C., and particles of at least one semicrystalline thermoplastic material having a melting point less than 200° C. to form a combined mixture; and kneading the combined mixture up to a maximum temperature of less than 80° C., wherein particles of at least one amorphous thermoplastic material having a glass transition temperature greater than or equal to 200° C. and particles of at least one semicrystalline thermoplastic material having a melting point greater than or equal to 200° C. are introduced during the non-productive stage or during the productive stage or during both the non-productive stage and the productive stage.

2. The process according to claim 1, wherein the at least one thermoplastic material is or are chosen from a group that includes: polypropylenes, polyethylenes, polystyrenes, acrylonitrile/butadiene/styrene copolymers, polymethyl methacrylates, polyamides, polyphenylene ethers, polycarbonates, polyacetals, thermoplastic polyurethanes, thermoplastic fluoropolymers, and polyesters.

3. The process according to claim 2, wherein the polyesters are chosen from a group that includes: polyethylene terephthalates, polybutylene terephthalates, and polyethylene naphthoates.

4. The process according to claim 2, wherein the fluoropolymers are chosen from a group that includes: copolymers of tetrafluoroethylene and hexafluoropropene, copolymers of tetrafluoroethylene and perfluorovinyl ether, copolymers of tetrafluoroethylene and ethylene, and polyvinylidene fluoride.

5. The process according to claim 1, wherein the glass transition temperature of the at least one amorphous thermoplastic material and the melting point of the at least one semicrystalline thermoplastic material are in a range of from 80° C. to 200° C.

6. The process according to claim 1, wherein the particles exhibit a volume-average diameter of between 50 and 100 µm.

7. The process according to claim 1, wherein the particles of the at least one thermoplastic material are present at a content of from 10 to 50 phr.

8. The process according to claim 1, wherein the particles of the at least one thermoplastic material are present at a content of from 20 to 40 phr.

9. The process according to claim 1, wherein the at least one diene elastomer is or are chosen from a group that includes: polybutadienes, natural rubber, synthetic polyisoprenes, butadiene copolymers, isoprene copolymers, and mixtures thereof.

10. The process according to claim 9, wherein the at least one diene elastomer is a butadiene/styrene copolymer.

11. The process according to claim 1, wherein the at least one reinforcing filler is or are chosen from a group that includes: silica, carbon black, and mixtures thereof.

12. The process according to claim 1, wherein the at least one reinforcing filler is or are present at a content of between 20 and 200 phr.

13. The process according to claim 1, wherein the at least one reinforcing filler is or are present at a content of between 30 and 150 phr.

* * * * *